US007338077B2

(12) United States Patent
Richard

(10) Patent No.: US 7,338,077 B2
(45) Date of Patent: Mar. 4, 2008

(54) STORAGE SYSTEM FOR A SUPPORT MAT

(76) Inventor: Ronnie J. Richard, 954 Chickasaw Dr., Lake Charles, LA (US) 70611

(*) Notice: Subject to any disclaimer, the term of this patent is extended or adjusted under 35 U.S.C. 154(b) by 17 days.

(21) Appl. No.: 11/139,388

(22) Filed: May 27, 2005

(65) Prior Publication Data

US 2006/0267326 A1 Nov. 30, 2006

(51) Int. Cl.
*B60R 9/06* (2006.01)
*B60S 9/02* (2006.01)

(52) U.S. Cl. ................ 280/769; 280/763.1; 280/764.1; 280/765.1; 280/766.1

(58) Field of Classification Search ................ 280/769, 280/763.1, 764.1, 765.1, 766.1
See application file for complete search history.

(56) References Cited

U.S. PATENT DOCUMENTS

| | | | | |
|---|---|---|---|---|
| 1,405,288 A * | 1/1922 | Clutter | 280/766.1 |
| 1,654,503 A * | 12/1927 | Jones | 280/423.1 |
| 2,985,318 A | 5/1961 | Nickles et al. | |
| 3,023,913 A | 3/1962 | Talbert | |
| 3,840,125 A | 10/1974 | Cozad | |
| 4,039,206 A * | 8/1977 | Nault | 280/763.1 |
| 4,067,595 A | 1/1978 | Vigerie | |
| 4,188,049 A | 2/1980 | Kimbro | |
| 4,266,809 A | 5/1981 | Wierflein | |
| 4,424,985 A | 1/1984 | Holmes | |
| 4,446,976 A | 5/1984 | Imerman et al. | |
| 4,449,734 A | 5/1984 | Cory | |
| 4,454,952 A | 6/1984 | McGhie | |
| 4,583,760 A | 4/1986 | Halstensgaard | |
| 4,860,539 A | 8/1989 | Parrett et al. | |
| 5,711,504 A * | 1/1998 | Cusimano | 248/354.3 |
| 6,164,697 A * | 12/2000 | Riggs | 280/763.1 |
| 6,341,705 B1 | 1/2002 | Kaspar | |
| 2001/0002086 A1* | 5/2001 | Webb | 280/765.1 |
| 2004/0046378 A1* | 3/2004 | Lagsdin | 280/766.1 |

* cited by examiner

*Primary Examiner*—Christopher P. Ellis
*Assistant Examiner*—John R. Olszewski
(74) *Attorney, Agent, or Firm*—J. Bruce Hoofnagle

(57) ABSTRACT

A storage system 84 provides facility for storing a support mat 62 on a crane 20, for transport with the crane to and from work sites, and for placement of the mat on a terrain 22 for receipt of a pad 40 extendable from an outrigger beam 26 of the crane, to support and stabilize the crane during heavy duty operation thereof. The storage system 84 includes a carrier 86 formed with a nest 88 for storing the mat 62, a support mount 154, mountable on, and for attaching the storage system to, the crane 20. A linking couple 171 attaches the carrier 86 to the support mount 154. A cable 184, or a drive chain 228, is attached to the mat 62, and is movable by operation of a hoist 182, or a powered cylinder 190, to move the mat 62 into and out of the nest 88.

20 Claims, 6 Drawing Sheets

STORAGE SYSTEM FOR A SUPPORT MAT

BACKGROUND OF THE INVENTION

This invention relates to a storage system for a support mat and, in particular, to a storage system for facilitating the storage of a support mat used, for example, to stabilize and support load-lifting apparatus.

Load-lifting apparatus, such as, for example, cranes, motorized work vehicles, excavating equipment, and the like (hereinafter referred to as "cranes"), have been used for many years to lift heavy loads. Typically, cranes can be used to lift and move heavy work equipment and supplies from one location to another at the work site, to move filler material, such as gravel, from a central supply to a surface area being treated, and to perform other similar load-lifting functions.

Generally, the cranes are driven to the work site under their own power, or are moved or towed to the work site by a separate vehicle. When performing heavy load-lifting operations at the work site, the cranes are located on terrain or ground, which may be rough, uneven or soft (all hereinafter referred to as "rough terrain"). Where the cranes are located on rough terrain, stabilization of the cranes is necessary before any heavy load-lifting efforts can be initiated, because of concerns of the crane tipping over.

In an effort to provide some measure of stabilization, a crane may be equipped with a plurality of beams, which function as outriggers. The beams are movably assembled with a body of the crane, and are extendable from the body but are retained therewith. When the crane is not being used in a load-lifting operation, the beams are retracted and stored within the body of the crane. In addition, a support pad is movably attached to an outboard end of each of the beams, and is also retained with the crane.

When the crane is to be used for a load-lifting operation, the crane is positioned at a desired location on the rough terrain. Thereafter, the stored outrigger beams are moved outward from the body of the crane to the extent that an inboard end of each of the beams remains supported within the body, and the outboard end of each of the beams is positioned at a prescribed crane-stabilizing location spaced from the crane and over the rough terrain.

Each of the support pads, which remain movably attached to the outboard end of the respective beam, is then moved into engagement with the rough terrain to provide stabilizing support of the crane during the load-lifting operation to preclude the crane from tipping one way or another, or perhaps tipping over.

Frequently, the size, weight and/or shape of the pads, which are at all times movably attached to the crane, are not sufficient to safely stabilize the crane on the rough terrain. In such instances, separate support mats, which are independent of the crane, and which are typically larger than the pads, are placed on the rough terrain at the locations where the pads would normally be placed. Thereafter, each of the pads is moved in a normal manner toward the previously placed mats, with each of pads coming to rest on the respective mat. This arrangement provides a safer and more stabilizing support for the crane compared to the support attained when only the pads are placed in direct contact with the rough terrain.

Because of the size, weight and shape of the support mats, the mats are usually transferred from a first work site, or a mat-storage location, to a second work site in a vehicle separate from the crane. Frequently, the mats and the cranes arrive at the second work site at different times, which results in unwanted and costly delays in setting up and stabilizing the cranes at the second work site.

In addition, when used, the mats must be precisely located on the terrain for engagement with the pads. The precise placement of the mats on the rough terrain requires special handling of the mats. In addition, the mats must be properly aligned for accurate placement of the pads on the respective mats. The placement and alignment of the mats involves considerable preparation time, thereby adding to the ultimate cost and time for the project associated with the planned load-lifting operation.

Even where it may be possible to store and transport the support mats on the crane when the crane is transferred from a first work site to a second work site, the mats would have to be secured in a stored location on the crane during the transfer of the crane. Upon arrival of the crane at the second work site, each of the mats would be detached from the stored location on the crane, and then completely removed from the crane, lifted, manipulated, aligned and placed in the prescribed location on the rough terrain at the second work site. Again, considerable and costly preparation time would be required.

Therefore, there is a need for a storage system for supporting the mats with the crane to facilitate transfer of the mats with the crane, from one work site to another, and to expeditiously and economically place the mats precisely on the rough terrain for eventual accurate placement of the respective pads thereon.

SUMMARY OF THE INVENTION

Therefore, it is an object of this invention to provide a storage system for a support mat used to stabilize and support a load-lifting apparatus.

Another object of this invention is to provide a storage system for a support mat, which will facilitate a safe and expeditious mode of transporting the mat on a load-lifting apparatus, from one work site to another.

A further object of this invention is to provide a storage system for a support mat, which will facilitate the expeditious and economical positioning of the mat at a desired location.

With these and other objects in mind, this invention contemplates a storage system for a support mat to facilitate storing the mat on a support structure. The storage system includes a carrier, and a nest formed on the carrier, with the nest being formed to receive the mat in a stored position therein. The storage system further includes means coupled to the carrier for mounting the carrier in a supported arrangement on the support structure, to facilitate storage of the mat with the support structure.

In addition, the storage system contemplated by this invention includes a carrier, a nest formed on the carrier, with the nest being formed to receive the mat in a stored position therein. The storage system further includes means, attachable to the support structure, for moving the mat relative to and independently of the carrier.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS OF THE INVENTION

Figure 1:
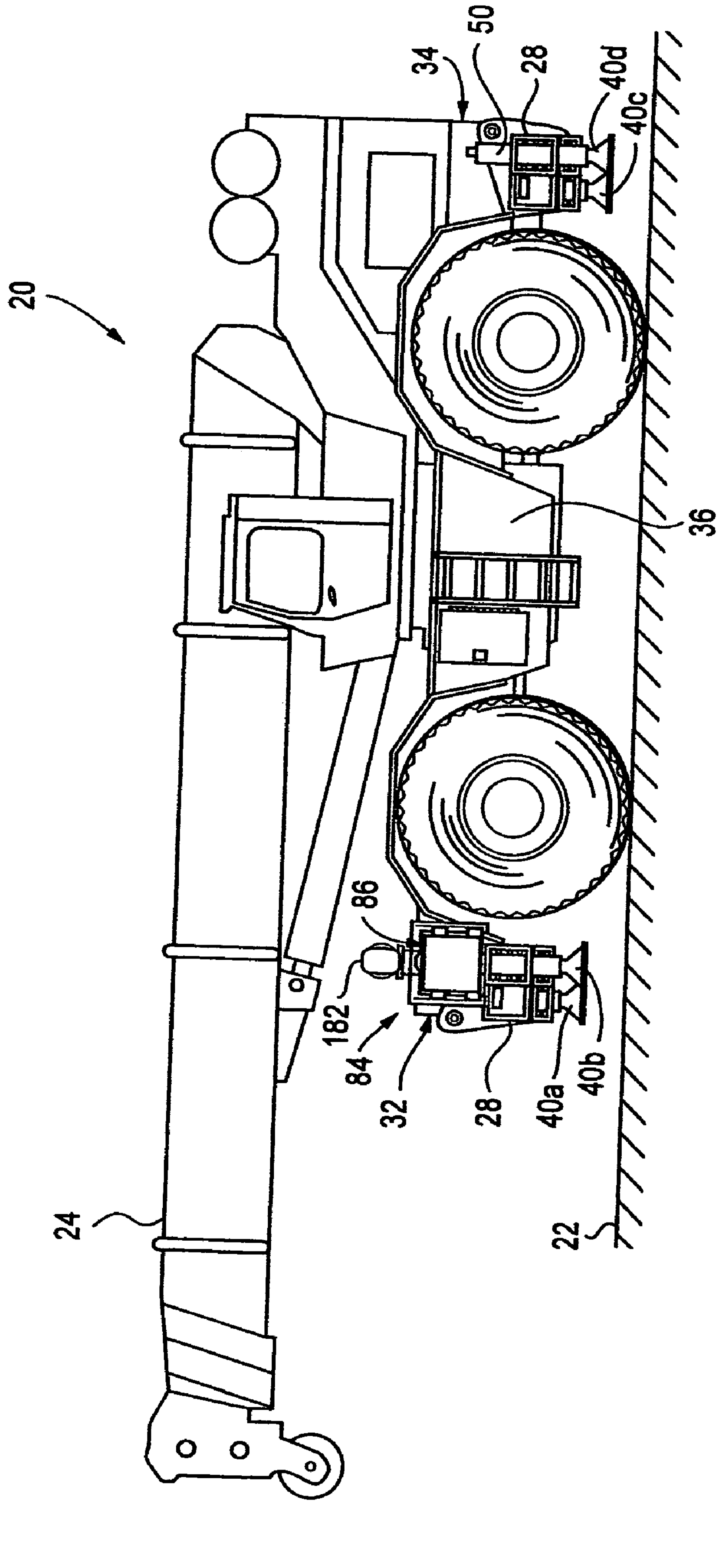
FIG. 1 is a side view showing a crane and a storage system for a support mat in accordance with certain principles of the invention.

Referring to FIG. 1, a load-lifting apparatus, such as, for example, a crane, a motorized vehicle, excavating equipment, and the like (all hereinafter referred to as "a crane 20"), is located on the ground or terrain 22 at a work site, and includes a boom 24 for lifting heavy loads. Such loads could include dirt, gravel, heavy equipment to be moved within the work site, or the like.

Figure 2:
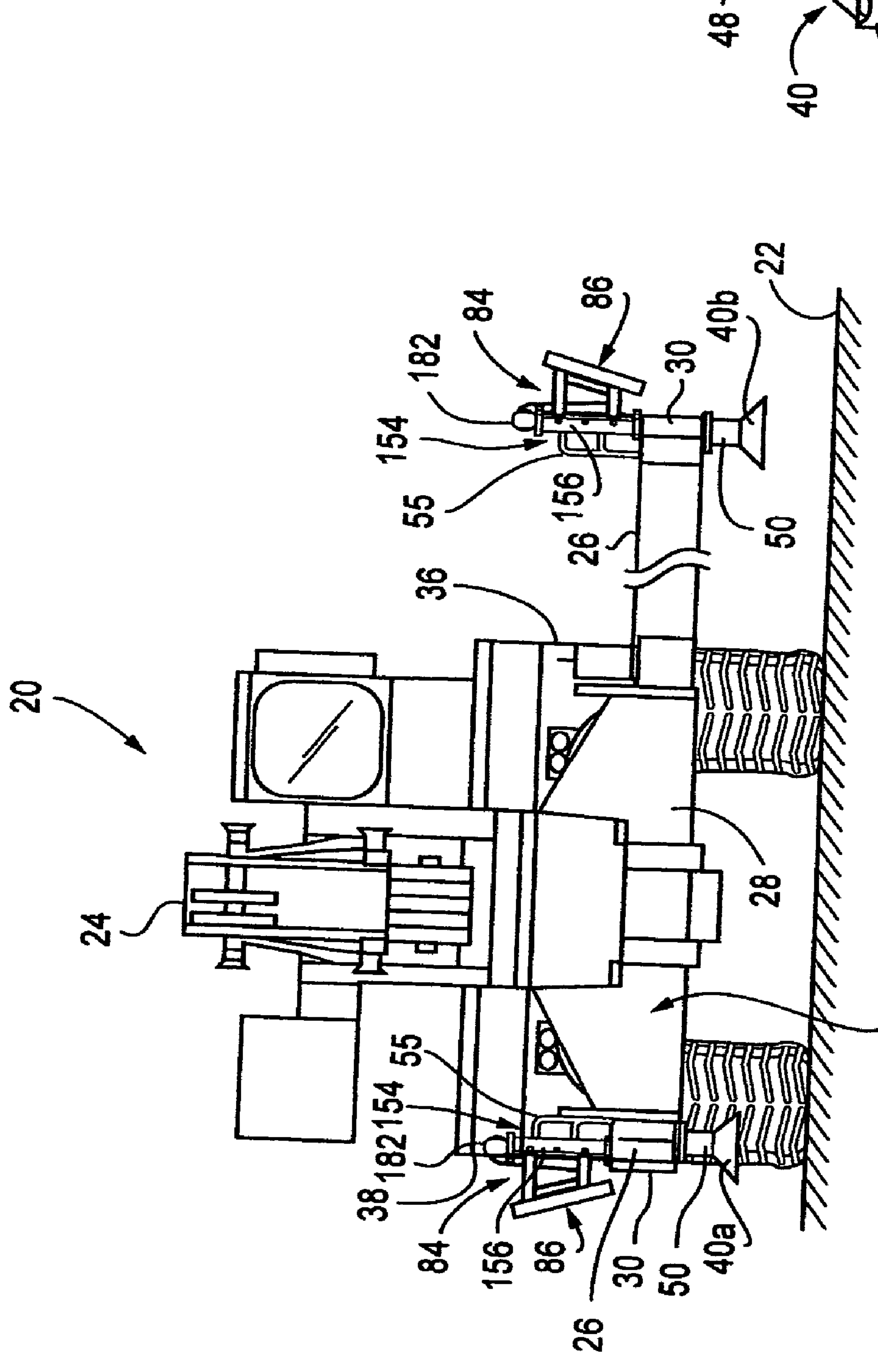
FIG. 2 is a front view showing the crane of FIG. 1 and the storage system for the support mat in accordance with certain principles of the invention.

Referring to FIG. 2, in a conventional context, four outrigger beams 26 (one shown) are movably contained and supported within a body 28 of the crane 20, with an outboard end 30 of each of the beams being extendable from four corners of the body for a limited distance to a position spaced from the body, for example, as shown by the extended single beam in FIG. 2. Referring to FIG. 1, two of the beams 26 are located within adjacent front channels (not shown) in a front 32 of the body 28, and the remaining two beams are located within adjacent rear channels (not shown) in a rear 34 of the body.

A first of the two beams 26 in the front 32 of the body 28 is extendable to the right, as viewed in FIG. 2, from within its respective channel and from a first side 36 of the body. A second of the two beams 26 (not shown) in the front 32 of the body 28 is extendable laterally from within its respective channel and from a second side 38 of the body, and to the left of the body when viewing the crane in FIG. 2. In similar fashion, the two beams 26 (not shown) located in the channels in the rear 34 of the body 28 are extendable laterally from within their respective channels from the respective first side 36 and second side 38 of the body.

It is noted that, even though the beams 26 are movable and extendable for a limited distance with respect to the body 28 of the crane 20, an inboard end (not shown) of each of the beams is retained within its respective channel, so that each beam, in its fully extended position, continues to be supported by, and remains movably attached to, the body.

As shown in FIG. 1, each of four pads 40*a*, 40*b*, 40*c*, and 40*d* extends below the outboard end 30 of a respective one of the four beams 26 for selected downward movement in a direction which is perpendicular to the respective beam. In particular, each of the four pads 40*a*, 40*b*, 40*c*, and 40*d*, as represented by a pad 40 in FIG. 3, includes a bottom plate 42 with an integral cylindrical hub 44 extending upward from the plate. The hub 44 is formed with a central bore 46 having a top opening 48. It is noted that hereinafter, where collective reference is made to the pads 40*a*, 40*b*, 40*c*, and 40*d*, they shall be identified and referred to as "the pads 40." Where individual reference is made to any one of the pads 40*a*, 40*b*, 40*c*, and 40*c*, such pad shall be identified as "the pad 40."

Each of four hydraulic cylinders, such as a hydraulic cylinder 50, (FIG. 3), is attached to the outboard end 30 (FIG. 2) of a respective one of the four beams 26. As shown in FIGS. 1, 2, 12 and 13, an upper portion 50*a* of the cylinder 50 extends above, and outside of, a top 51 of the outboard end 30 of the beam 26.

Figure 3:
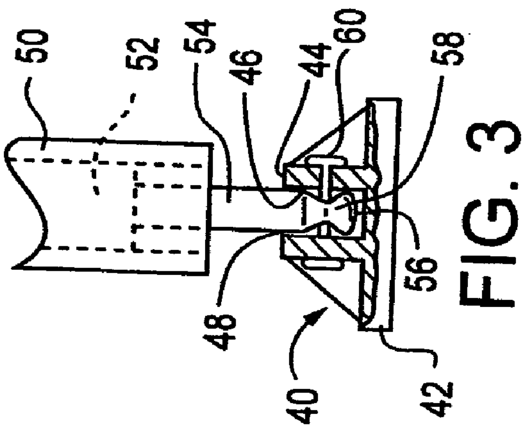
FIG. 3 is a partial section view showing a pad which is movably attached to the crane of FIG. 1.

Referring to FIG. 3, each of the cylinders 50 includes a piston 52 and a piston rod 54, which is mounted for movement vertically perpendicularly with respect to a respective one of the beams 26. Also, a pair of hydraulic fluid lines 55 (FIGS. 2, 12 and 13) are connected to the cylinder 50 to facilitate selective movement of the piston 52 within the cylinder. An outboard end 56 of the piston rod 54, which is formed with a neck 58, is inserted into the bore 46 of the hub 44.

A plurality of threaded elements 60 are mounted in threaded holes formed in a side wall of the hub 44, with an inboard end of each threaded element being located in the neck 58 of the piston rod 54. This arrangement facilitates the coupling and permissible movement of the pad 40 with the piston rod 54, and allows limited leveling movement of the pad, when the pad is lowered into engagement with the terrain 22 (FIGS. 1 and 2).

In conventional use, the crane 20 is driven or moved onto a work site and is parked at a desired work location. Thereafter, each of the beams 26 are extended from the stored position, within the respective channel of the body 28, to the limited extent represented by the sole extended beam in FIG. 2. Each of the hydraulic cylinders 50 are then operated to lower the pads 40 into engagement with the terrain 22 in an effort to stabilize the support of the crane 20 during a load-lifting work operation, for the purpose of preventing the upsetting or tipping of the crane.

Frequently, the relatively small physical size of each of the pads 40 limits the ability of the pads to provide safe stabilization of the crane 20, particularly when the terrain 22 is rough, soft and/or uneven. In these situations, some form of additional, relatively larger support between each of the pads 40 and the terrain 22 must be provided to insure safe and sufficient stabilization of the crane 20.

Figure 4:
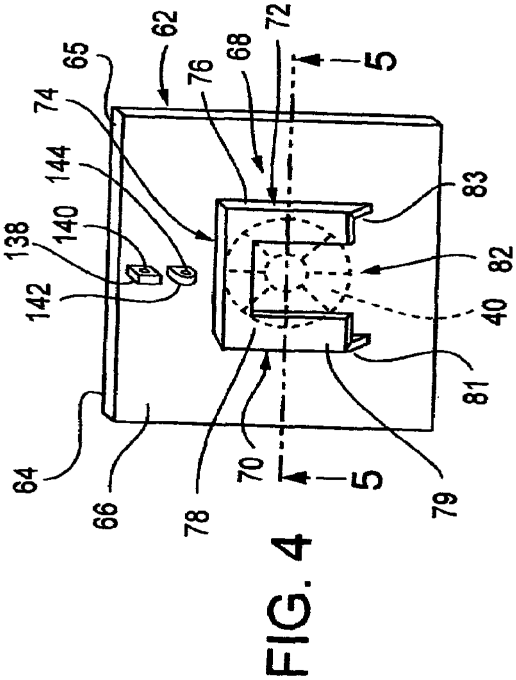
FIG. 4 is a perspective view showing a support mat with a locking block mounted thereon in accordance with certain principles of the invention.
Figure 5:
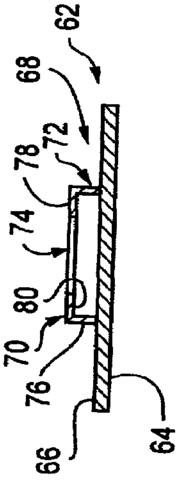
FIG. 5 is a sectional view taken along line 5-5 of FIG. 4 showing details of the support mat of FIG. 4.

One known source of such additional support are four support mats 62, one of which is illustrated in FIGS. 4 and 5. The mats 62 are physically independent of, and do not form any part of, the crane 20 or the pads 40. Each of the mats 62 is formed with a square shape, with side dimensions thereof being, for example, three feet by three feet, and the thickness being, for example, one inch. Mats of other shapes, configurations, and dimensions can be used for the purpose of providing stabilizing support for the crane 20.

Each of the mats 62 is formed with a first major surface 64, which typically seats on the terrain 22. Also, each of the mats 62 is formed with a second major surface 66, which is on a side of the mat opposite the first major surface 64, and onto which the respective pads 40 will be seated to provide stabilizing support for the crane 20. Each of the mats 62 is formed with a forward edge 65, which extends between the first major surface 64 and the second major surface 66.

In conventional use, the crane 20 is moved into place at the work site and onto the terrain 22. Each of the four mats 62 is placed on the terrain 22 at the locations where respective ones of the pads 40 would normally be placed on the terrain in the process of stabilizing the crane 20.

After the mats 62 have been placed generally in the appropriate locations on the terrain 22, the beams 26 are hydraulically controlled by an operator to move each pad 40 to a position over its respective mat. Each of the hydraulic cylinders 50 are then controlled by the operator to lower each of the pads 40 onto the second major surface 66 of the respective mat 62. The crane 20 is now stabilized by the mats 62, and use of the crane can proceed safely without concern for the tipping of the crane during a heavy load-lifting operation.

It is noted that, during the process of locating and positioning the pads 40 onto their respective mats 62, the crane 20 and/or the beams 26 with the pads may have to be moved slightly laterally, and/or the mats may have to be moved slightly on the terrain 22, to insure that each pad is aligned over its respective mat prior to lowering the pads onto the respective mats. This can be a time-consuming and costly procedure.

Typically, the mats 62, which are independent of the crane 20 and the pads 40, are transported from a first work site to a second work site by loading the mats onto a separate vehicle, such as a truck (not shown), and driving the truck to the second work site.

This requires heavy manual lifting and manipulation of the mats 62, as the mats are loaded onto the truck at the first work site, and unloaded at the second work site, which is time-consuming and costly. Also, since the mats 62 are transported independently of the crane 20, costly delays may be encountered when the mat-hauling truck arrives at the second work site well after the arrival of the crane.

Further, since there are four spaced pads 40, each of which have to be maneuvered independently of the other pads, considerable time and labor is required to coordinate the independent maneuvering of each of the pads with respect to its respective mat 62. As noted above, this maneuvering can be accomplished by movement of the crane 20, the respective beam 26, and/or the respective mat 62, in an attempt to precisely locate the pad onto the second major surface 66 of the respective mat.

Each mat 62 has a U-shaped pad nest 68 attached to the second major surface 66 thereof. The nest 68 facilitates the optimal locating and positioning of each of the pads 40 on the respective mat 62. In particular, the nest 68 is secured generally centrally to the second major surface 66 of the mat 62 for receipt of a respective one of the pads 40. The nest 68 is formed by spaced, parallel side rails 70 and 72, and a linking rail 74 which is formed with, and extends between, a first set of adjacent spaced ends of the rails 70 and 72.

Each of the rails 70, 72 and 74 is formed with an "L" shaped cross-section, and includes a side section 76 extending perpendicularly from, with an inboard edge attached to, the second major surface 66 of the mat 62. Each of the rails 70, 72 and 74 are also formed with an overhanging section 78, which is joined with the side section 76 along a common edge of the two sections. The overhanging sections 78 extend perpendicularly and inward from the common edge of the respective one of the rails 70, 72 and 74 toward a central axis of the mat 62, to form a U-shaped roof 79 as illustrated in FIG. 4.

An undersurface 80 (FIG. 5) of the roof 79 of the nest 68 is spaced from the interfacing portion of the second major surface 66, which is directly opposite the roof, by a distance slightly greater than the thickness of the pad 40. An opening 82 of the nest 68 is formed between a second set of adjacent spaced ends 81 and 83 of the side rails 70 and 72, respectively, opposite the first set of adjacent space ends of the side rails. The second set of adjacent spaced ends 81 and 83 of the side rails 70 and 72, respectively, are angled downward and outward, as viewed in FIG. 4, from the roof 79 of the nest 68 to the second major surface 66 of the mat 62, to facilitate relatively easy entry of the pads 40 into the nest 68.

Referring to FIG. 4, in order to precisely locate each pad 40 onto its respective mat 62, the pad nest 68 is secured to the second major surface 66 of the mat in a central position, thereby defining the optimum position of the pad on the mat. After the mat 62 has been initially placed on the terrain 22, as described above, the respective pad 40 is moved downward to a position slightly above the second major surface 66, adjacent the opening 82 and outside of the nest 68. The pad 40 can then be moved relatively through the opening 82 and into the nest 68 to the location illustrated in phantom in FIG. 4, by maneuvering the crane 20, the respective beam 26, and/or the respective mat 62, as noted above.

With the nest 68 defining the optimum location for the pad 40 on the second major surface 66 of the mat 62, the nest provides facility for easily guiding the pad into the optimum location, thereby providing a time-saving and relatively less-costly technique for placing the pad on the mat at an optimally safe location.

Figure 6:
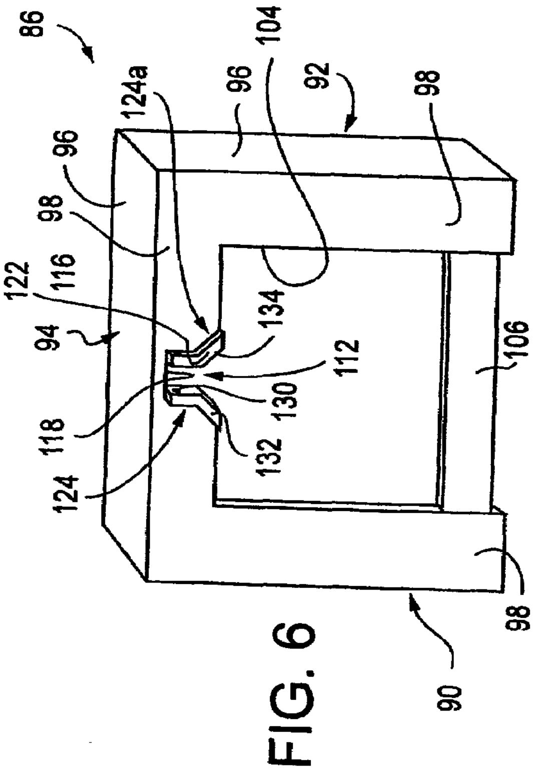
FIG. 6 is a perspective view showing external features of a carrier of the storage system of FIG. 1 in accordance with certain principles of the invention.
Figure 7:
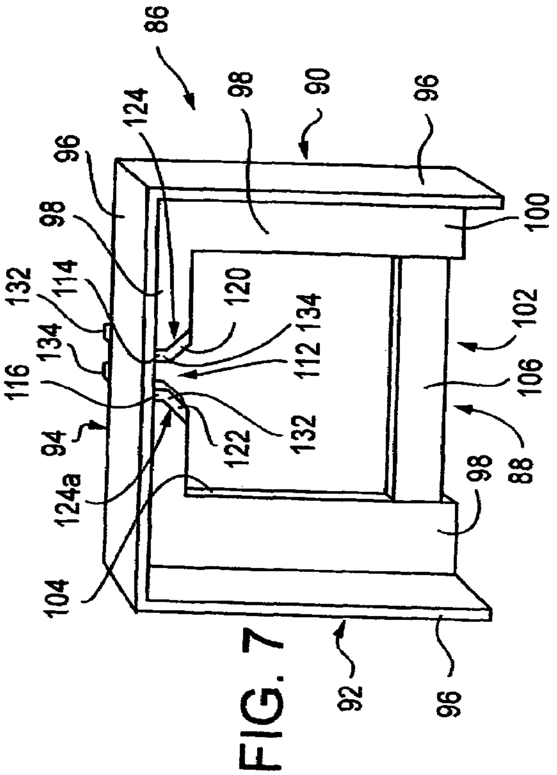
FIG. 7 is a perspective view showing internal features of the carrier of FIG. 6 in accordance with certain principles of the invention.
Figure 10:
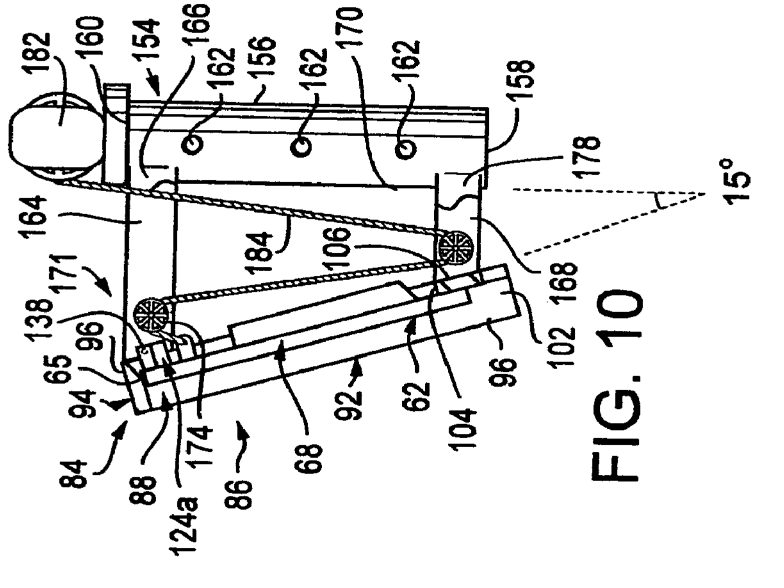
FIG. 10 is a side view showing a first preferred embodiment of the storage system of FIG. 1 in accordance with certain principles of the invention.

As shown in FIG. 10, in a first preferred embodiment of the invention, a storage system 84 provides facility for storing the mat 62 on a support structure such as, for example, the crane 20. Referring to FIGS. 6 and 7, the storage system 84 includes a carrier 86, which defines a U-shaped mat nest 88. The nest 88 is formed by three integrally-joined rails 90, 92 and 94. Two of the rails 90 and 92 are parallel and spaced from each other, and the remaining rail 94 is a linking rail, which is formed with, and extends between, a first set of adjacent spaced ends of the spaced parallel rails.

Each of the rails 90, 92 and 94 is formed with an "L" shaped cross-section, and includes a side section 96 and a lateral section 98, which extends perpendicularly and inward from a common integrally joined edge of the side section and the lateral section.

As shown in FIG. 7, the lateral sections 98 of the three rails 90, 92 and 94 of the carrier 86 combine to form a floor 100 of the carrier and the mat nest 88. Inboard sides of the three side sections 96 of the three rails 90, 92 and 94, combine to form three side walls of the carrier 86 and the nest 88, with each side wall having a surface which is contiguous with at least portions of the surface of the floor 100. In effect, the three sections 96 form the three side walls which, singly or in combinations of two or three sections, form an enclosure, with the single side wall, or combination of two or three side walls, at least partially surrounding the enclosure. With this arrangement, at least portions of the floor form a floor of the enclosure. An opening 102 (FIG. 7) of the nest 88 provides a fourth and open side of the nest.

The carrier 86 could include the floor 100, which has a surface, and at least one of the side walls, which is formed with and extends from the surface of the floor. Also, the mat nest 88 could include at least a portion of the surface of the floor 100 and a surface of at least one side wall, which is contiguous with the at least a portion of the surface of the floor. The carrier 86 could include the three side walls, which are formed with, and extend from, the surface of the floor 100. Two of the side walls form a pair of spaced side walls, with the remaining side wall being a linking wall extending between, and attached to, spaced portions of the pair of spaced side walls.

A strengthening member, such as a flat bar 106, is located adjacent the opening 102 of the nest 88, and is attached at opposite ends thereof to, and extends between, interfacing inboard edges of the lateral sections 98 of the parallel rails 90 and 92. The flat bar 106 is formed with a surface 108 which is flush with the surface of the floor 100, and forms a part thereof. With this structural arrangement of the three lateral sections 98 of the rails 90, 92 and 94 and the flat bar 106 forming the floor 100, an opening 104 is formed in the floor, which is defined by interfacing inboard edges of the three lateral sections and the flat bar. In addition, the location and presence of the flat bar 106 enhance the sturdiness of the carrier 86.

Referring again to FIGS. 6 and 7, a slot 112 is formed in a central portion of the lateral section 98 of the linking rail 94, and extends from an outboard edge of the lateral section to a location near the common edge where the lateral section joins with the side section 96 of the linking rail. The slot 112 is formed with two spaced parallel side walls 114 and 116, having inboard ends which extend from an inboard end 118 (FIG. 6) of the slot toward, and are perpendicular to, the outboard edge of the lateral section 98 of the linking rail 94. Outboard ends of the spaced parallel side walls 114 and 116 are contiguous with inboard ends of respective interfacing flared side walls 120 and 122, which extend to the outboard edge of the lateral section 98 of the linking rail 94. Each of the side walls 120 and 122 is flared outward at a prescribed side-wall angle from the respective side walls 114 and 116.

Figure 8:
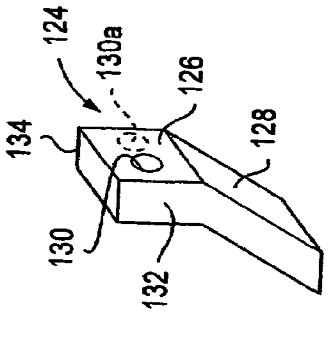
FIG. 8 is a perspective view showing a locking bar of the storage system of FIG. 1 for assembly with the carrier of FIG. 6 in accordance with certain principles of the invention.

Referring now to FIGS. 6, 7 and 8, a first locking bar 124 is formed with an upper section 126, located in a first plane, and a lower section 128, located in a second plane at a prescribed locking-bar angle from the first plane. The prescribed locking-bar angle is equal to the above-noted prescribed side-wall angle of the flared side walls 120 and 122 of the slot 112 of the carrier 86. The upper section 126 and the lower section 128 of the locking bar 124 are integrally joined at an intermediate juncture, where the lower section is angled from the upper section.

The locking bar 124 is formed with an outboard face 130, a front edge 132 and a rear edge 134. An opening 136 is formed in the outboard face 130, and through the upper section 126 of the locking bar 124, and is located adjacent the front edge 132 thereof. A second locking bar 124*a* (FIGS. 6 and 7) is shaped identically to the first locking bar 124, except that an opening 136*a*, shown in phantom in FIG. 8, which is also formed in the outboard face 130 and through the upper section 126, is located adjacent the rear edge 134.

As shown in FIGS. 6 and 7, the locking bars 124 and 124*a* are assembled with the carrier 86, on opposite sides of the slot 112. In particular, the upper sections 126 of the locking bars 124 and 124*a* are attached to the interfacing side walls 114 and 116, respectively, of the slot 112. Also, the lower sections 128 of the locking bars 124 and 124*a* are attached to the interfacing side walls 120 and 122, respectively, of the slot 112. Further, the rear edge 134 of the locking bar 124, and the front edge 132 of the locking bar 124*a*, are flush with the floor 100 (FIG. 7). The portions of the locking bars 124 and 124*a*, which include the respective openings 130 and 130*a*, are located outboard from the lateral section 98 of the linking rail 94, as viewed in FIG. 6, in such a fashion that the respective openings are clear of the linking rail, and are spaced from, and aligned with, each other.

As shown in FIG. 4, a locking block 138 is mounted on the second major surface 66 of the mat 62, and is formed with a through hole 140. A coupling block 142, the purpose for which is described hereinbelow, is also mounted on the second major surface 66 of the mat 62, inboard from, and adjacent, the locking block 138, and is formed with a through hole 144.

Figure 9:
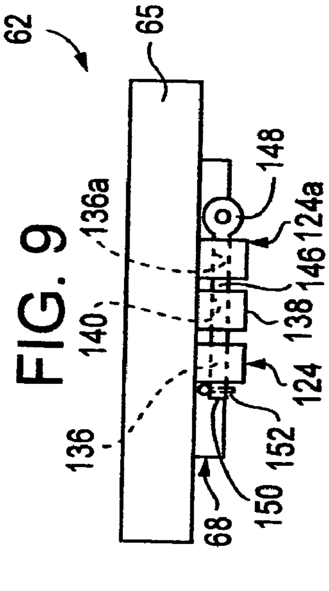
FIG. 9 is a top view showing the mat of FIG. 4 with the locking block located adjacent, and secured with, locking bars of FIG. 8 in accordance with certain principles of the invention.

The mat 62 can be movably assembled within the nest 88 of the carrier 86, as shown in FIG. 10, during selected periods for the purpose described below. During such selected periods, it is desirable to secure the mat 62 with the carrier 86, which, in turn, is secured with the crane 20 as described below. In the assembled position of the mat 62 within the nest 88, the locking block 138 is located between the spaced locking bars 124 and 124*a*, as represented in FIG. 9, with the three respective through holes 140, 136 and 136*a* being aligned, which provide a means for facilitating securance of the mat with the carrier 86.

A securance pin 146, having a head 148 at one end thereof, is inserted through the three aligned through holes 144, 136 and 136*a*, with the head located adjacent an outboard side of the locking bar 124*a*. A free end 150 of the securance pin 146 extends beyond an outboard side of the locking bar 124, and is formed diametrically with a through hole for receipt of a cotter pin 152 to selectively retain the mat 62 in a secured assembly with the carrier 86.

Thus, the locking bars 124 and 124*a*, the locking block 142, the securance pin 146, and the cotter pin 152 form a means attachable in part to the mat 62 and mounted in part on the carrier 86, for facilitating the locking of the mat in the stored position within the nest 88.

Figure 11:
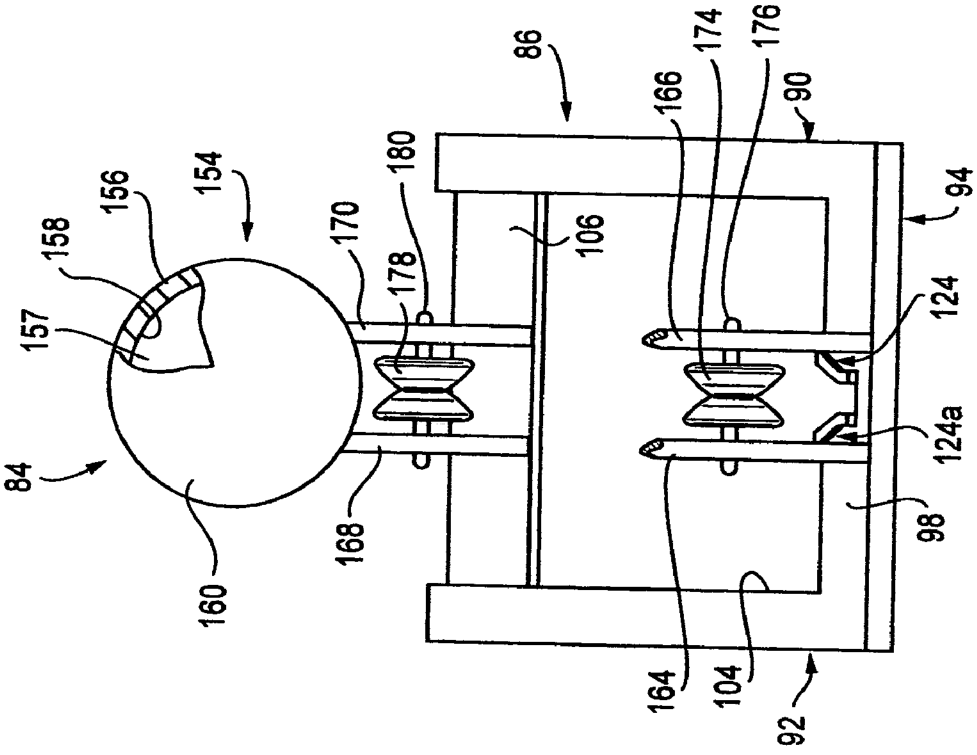
FIG. 11 is a top view showing features of the first preferred embodiment of the storage system of FIGS. 1 and 10 in accordance with certain principles of the invention.

Referring to FIGS. 10 and 11, the first embodiment of the storage system 84 further includes a support mount 154, which is structured for assembly with complementary structure of the crane 20. The support mount 154 is formed in the shape of a cylinder 156 with a hollow core 157 (FIGS. 11, 12 and 13), which is open at a bottom end 158 and closed at a top end 160 thereof. The diameter of the core 157 of the cylinder 156 is slightly larger than the exterior diameter of the upper portion 50*a* of the cylinder 50. A plurality of through holes 162 are formed radially in the cylinder 156 and provide threaded passage for threaded fasteners 163

(FIGS. 12, 13 and 15), which facilitate securance of the support mount 154 with the complementary structure of the crane 20.

It is noted that, while the support mount 154 is in the form of the hollow cylinder 156, the support mount could be of other shapes and configurations without departing from the spirit and scope of the invention. For example, the support mount could be an element which is placed in interfacing engagement with a portion of the crane 20, which is not necessarily complementary in structure with the facing structure of the crane, and secured thereto by fasteners, welding, and the like.

Referring again to FIGS. 10 and 11, a first pair of spaced struts, in the form of spaced flat bars 164 and 166, being of a prescribed equal length, extend between spaced upper portions of the cylinder 156 and spaced portions of the outboard surface of the lateral section 98 of the linking rail 94 of the carrier 86. A first end of each of the spaced flat bars 164 and 166 are secured, for example, by welding, to the spaced upper portions of the cylinder 156. A second end of each of the spaced flat bars 164 and 166, which are opposite the respective first ends thereof, are secured, for example, by welding, to the outboard surface of the lateral section 98 of the linking rail 94 of the carrier 86 on opposite outboard sides of the locking bars 124 and 124*a*.

A second pair of spaced struts, in the form of spaced flat bars 168 and 170, being of equal length which is less than the above-noted prescribed equal length of the first pair of flat bars 164 and 166, extend between spaced lower portions of the cylinder 156 and spaced portions of the outboard surface of the flat bar 106 of the carrier 86. A first end of each of the spaced flat bars 168 and 170 are secured, for example, by welding, to the spaced lower portions of the cylinder 156. A second end of each of the spaced flat bars 168 and 170, which are opposite the respective first ends thereof, are secured, for example, by welding, to the outboard surface of the flat bar 106.

Thus, the flat bars 164, 166, 168 and 170 form a linking couple 171, which extend between, and are attached to, the carrier 86 and the support mount 154.

The second ends of the flat bars 164 and 166, which are secured to the linking frame 94 of the carrier 86, and the second ends of the flat bars 168 and 170, which are secured to the flat bar 106 of the carrier, are each bevelled at a prescribed angle, such as, for example, fifteen degrees, from top to bottom thereof. In similar fashion, the second ends of the flat bars 168 and 170, which are secured to the flat bar 106 of the carrier 86, are each bevelled at the prescribed angle of fifteen degrees, from top to bottom thereof. Since the equal lengths of the first pair of flat bars 164 and 166 are longer than the equal lengths of the second pair of flat bars 168 and 170, and with the second ends of the first and second pairs of flat bars being bevelled at the prescribed angle of fifteen degrees, the carrier 86 and the support mount 154 are spatially coupled at the prescribed angle of fifteen degrees with respect to each other.

While the prescribed angle of fifteen degrees is the preferred angle, angles other than fifteen degrees could be employed without departing from the spirit and scope of the invention, provided that the mat 62 could be moved into, and out of, the nest 88 of the carrier 86 in the manner described hereinbelow.

In this manner, the support mount 154 forms a means, which is coupled to the carrier 86, for mounting the carrier in a supported arrangement on a support structure, such as, for example, the crane 20, to facilitate storage of the mat 62 with the support structure.

Figure 13:
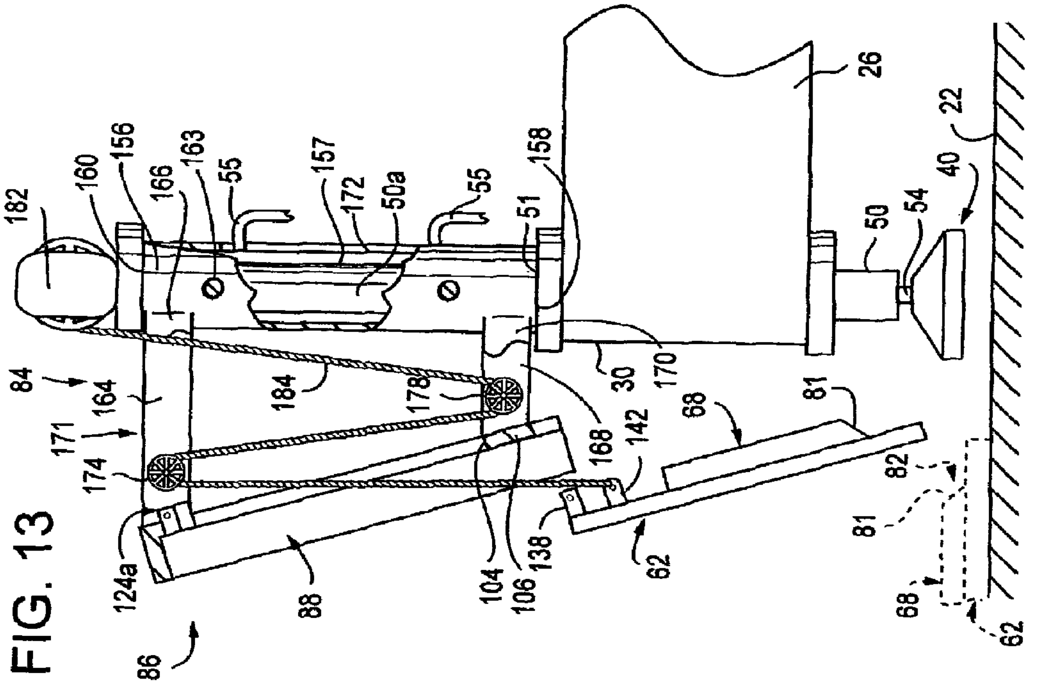
FIG. 13 is a side view showing the first preferred embodiment of the storage system of FIG. 10 in assembly with the crane of FIG. 1 and in an operative position for moving the support mat of FIG. 4 in accordance with certain principles of the invention.
Figure 12:
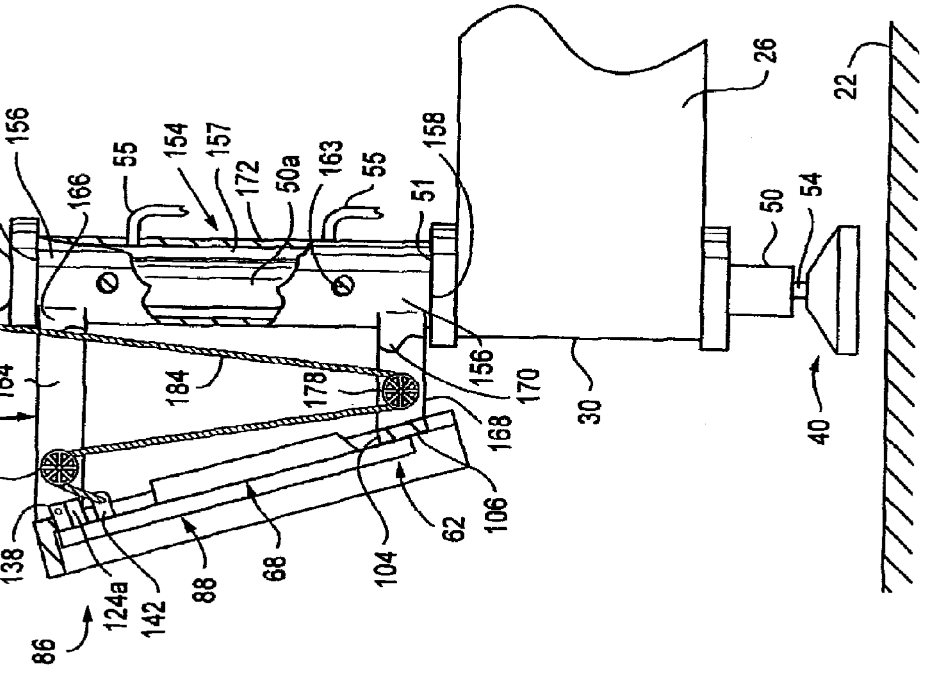
FIG. 12 is a side view showing the first preferred embodiment of the storage system of FIG. 10 in assembly with the crane of FIG. 1 in accordance with certain principles of the invention.

As shown in FIGS. 12 and 13, the cylinder 156 is formed with a through slot 172 of narrow width, which extends longitudinally in an axial direction. The slot 172 extends from, and communicates with the opening of, the bottom end 158 of the cylinder 156, and extends toward the top end 160 thereof, to a location generally in horizontal alignment with the flat bars 164 and 166.

As shown in FIG. 11, a first sheave 174 is mounted on a shaft 176, the ends of which extend through spaced aligned holes formed in the spaced flat bars 164 and 166, adjacent the locking bars 124 and 124*a*, to support the sheave for rotation relative to the flat bars. A second sheave 178 is mounted on a shaft 180, the ends of which extend through spaced aligned holes formed in the spaced flat bars 168 and 170, adjacent the locking bars 124 and 124*a*, to support the sheave for rotation relative to the flat bars.

As shown in FIGS. 10, 12 and 13, a motor-driven hoist 182 is secured to the top end 160 of the cylinder 156, and has a strand, such as, for example, a length of heavy duty cable 184, wound thereon. The cable 184 could be, for example, a three-eighths inch stainless steel cable. A leading portion of the cable 184 extends from the hoist 182, about portions of the sheaves 174 and 178, with a leading end of the cable being attached to the coupling block 142, which is mounted on the second major surface 66 of the mat 62. The leading end of the cable 184 thereby constitutes a first portion of the cable which is attachable to the mat 62. A trailing, or second, portion of the length of cable 184 is wound onto the hoist, and is, thereby, in engagement with the hoist.

Thus, in the first embodiment of the storage system 84, the hoist 182 is a means for moving the cable 184. The hoist 182 and the cable 184 form a means, which is attachable to a support structure, such as, for example, the crane 20, for moving the mat 62 relative to and independently of the carrier 86. The sheaves 174 and 178 form a means, attached to the linking couple 171 formed by the flat bars 164, 166, 168 and 170, for guiding the cable 184 during operation of the hoist 182, i.e., the means for moving the strand.

Referring to FIGS. 12 and 13, the storage system 84 can be attached to the crane 20 prior to attaching the hoist 182 to the cylinder 156, prior to coupling the mat 62 to the cable 184, and prior to the mat being located within the mat nest 88. For example, the storage system 84 can be manipulated to locate the cylinder 156 of the support mount 154 over the upper portion 50*a* of the hydraulic cylinder 50, with the bottom end 158 of the cylinder 156 resting on the top 51 of the outboard end 30 of the beam 26. The fasteners 163 are then urged into engagement with the exterior of the hydraulic cylinder 50 to facilitate securance of the storage system 84 with the crane 20.

As the cylinder 156 is moved into position to be placed over the hydraulic cylinder 50, the slot 172 of the cylinder 156 is aligned to receive the hydraulic lines 55 to facilitate uninterrupted installation of the cylinder 156 over the cylinder 50.

Figure 14:
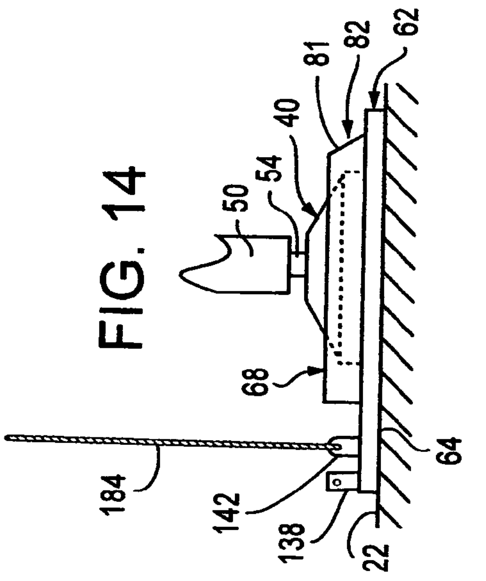
FIG. 14 is a side view showing the support mat of FIG. 4 located on a terrain with the pad of FIG. 3 in assembly therewith in accordance with certain principles of the invention.

Thereafter, the hoist 182 can be positioned on the top end 160 of the cylinder 156, and secured thereto by welding or other conventional means of attaching one element to another. The hoist 182 can then be operated to feed a sufficient length of the leading portion of the cable 184 to be placed over the sheaves 174 and 178, with the leading end of the cable extending to the terrain 22. An unattached mat 62 is positioned on the terrain 22, as shown in FIG. 14, to locate the leading end of the cable 184 adjacent the coupling block 142, whereafter the leading end is attached to the coupling block.

As illustrated in FIG. 13, the hoist 182 is then operated to raise the attached mat 62 to an intermediate level between the carrier 86 and the terrain 22. Referring to FIG. 12, the hoist 182 continues to raise the attached mat 62, and moves the mat into the mat nest 88 of the carrier 86. As the attached mat 62 is being moved into the mat nest 88, the pad nest 68, which is mounted on the mat, is moved into the opening 104 in the floor 100, and the mat is moved into engagement with the floor for a snug storage of the mat with the storage system 84 and the crane 20.

As the attached mat 62 is moved into the mat nest 88, the locking block 138, which is mounted on the mat, is moved between the locking bars 124 and 124*a*, and the pin 146 and the cotter pin 150 are assembled with the aligned locking block and locking bars as described above. In this manner, the attached mat 62 is secured in its stored position within the mat nest 88, and can be transported safely with the crane 20 from one work site to another.

The elements, including the hoist 182 and the cable 184, could be assembled with the cylinder 156, and the mat 62 could be assembled with the carrier 86, prior to assembly of the cylinder 156 with the crane 20, without departing from the spirit and scope of the invention. Further, the assembling of these elements could be accomplished in other sequences, without departing from the spirit and scope of the invention.

When a crane 20 arrives at a work site with the attached mat 62 being stored and secured in the mat nest 88 of the carrier 86, the cotter pin 152 is removed from the free end 150 of the pin 146, and the pin 146 is removed from assembly with the locking bars 124 and 124*a*, and the locking block 138, to remove the mat from its secured position with the carrier. Thereafter, the hoist 182 is selectively operated, by control of an operator, to feed the cable 184 in a direction wherein the attached mat 62 begins to be lowered, under its weight, from the mat nest 88 of the carrier 86 and toward the terrain 22 in the manner illustrated in FIG. 13.

It is noted that, as the attached mat 62 is moved downward toward the terrain 22, the distribution of the weight of the mat causes the leading or free end of the mat to extend to the right, as viewed in FIG. 13, relative to the trailing end of the mat, which is coupled to the leading end of the cable 184. In this manner, even though the attached mat 62 is being moved vertically downward, the mat is maintained at an angle with respect to the terrain 22.

As the attached mat 62 approaches the terrain 22, the leading end initially engages the terrain where, due to the angle at which the mat is being lowered, the first major surface 64 of the mat is gradually moved into full engagement with the terrain, as shown in phantom in FIG. 13. At this time, the respective pad 40 is located to the right of the opening 82 of the pad nest 68.

The hydraulic system of the crane 20 can be selectively operated to move the pad vertically downward into horizontal alignment with the opening 82 of the pad nest, but slightly above a plane which includes the second major surface 66 of the mat. The beam 26, as shown in FIG. 13, can then be moved to the left to move the pad 40 into the pad nest 68. The hydraulic system of the crane 20 is then operated to again move the pad 40 vertically downward into engagement with the second major surface 66 of the mat 62, whereby the pad is supported on the mat. During the movement of the pad 40 into the pad nest 68, the hoist 182 is operated to provide sufficient slack in the cable 184 to allow the relative movement between the pad and the mat. The placement of the remaining three pads 40 within the respective pad nests 68 is accomplished in similar fashion.

In this manner, the mats 62 provide additional, relatively larger support between the pads 40 and the terrain 22, to insure safe and sufficient stabilization of the crane 20 during the operation thereof, which is particularly important when the terrain is rough, soft and/or uneven.

Figure 15:
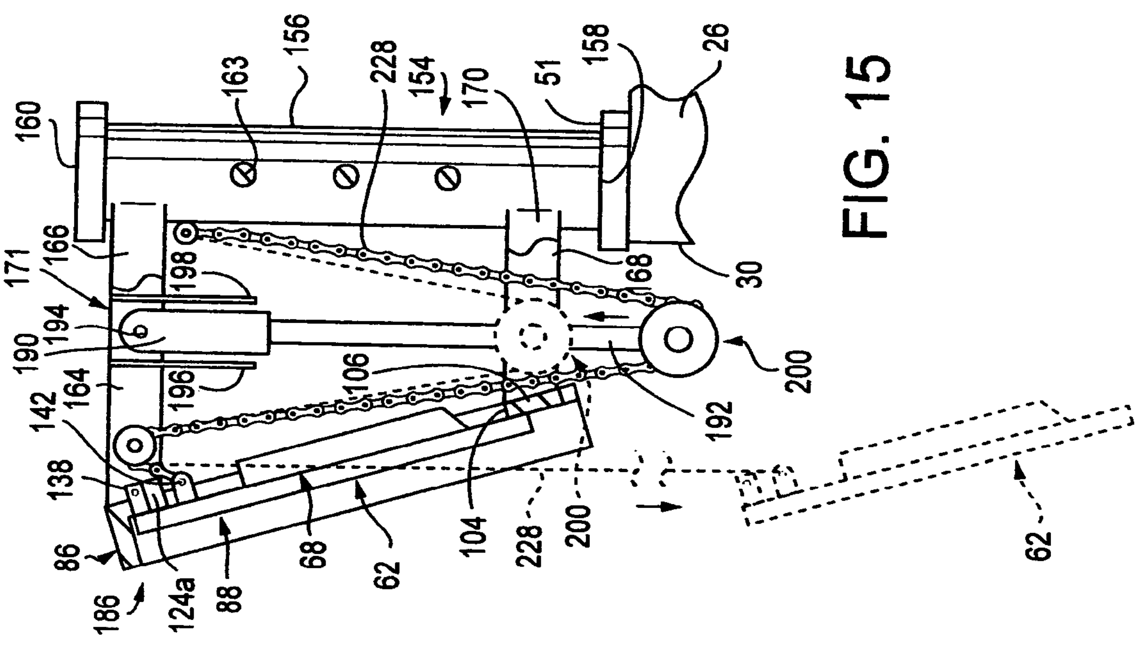
FIG. 15 is a side view showing a second preferred embodiment of the storage system of FIG. 1 in assembly with crane of FIG. 1 in accordance with certain principles of the invention.

As shown in FIG. 15, there is illustrated a second preferred embodiment of a storage system 186 for facilitating the storing of the mat 62 on the support structure such as, for example, the crane 20. The second embodiment of the storage system 186 utilizes many of the same components of the first preferred embodiment of the storage system 84. For example, the carrier 86, the support mount 154, and the linking couple 171 formed by the flat bars 164, 166, 168 and 170, and the detailed structure of the carrier, the support mount and the linking couple are identical in both of the storage systems 84 and 186. The hoist 182, the cable 184 and the sheaves 174 and 178 have been replaced by a mat moving system 188.

In the following description, the carrier 86, the support mount 154 and the linking couple 171 will be referred to only where they relate to the mat moving system 188. Otherwise, it is to be understood that the carrier 86, the support mount 154 and the linking couple 171 are of the same structure, and function in the same manner, as described above with respect to the storage system 84.

The mat moving system 188 includes a hydraulically powered cylinder 190 with a piston rod 192 extending downward therefrom. The upper end of the cylinder 190 is mounted for pivoting movement to a shaft 194 which extends between, and is attached to, the flat bars 164 and 166. A pair of spaced flat plates 196 and 198 are attached at the upper ends thereof to, and extend between, the flat bars 164 and 166, and are positioned on opposite sides of the cylinder 190 to limit the pivoting movement thereof.

Figure 16:
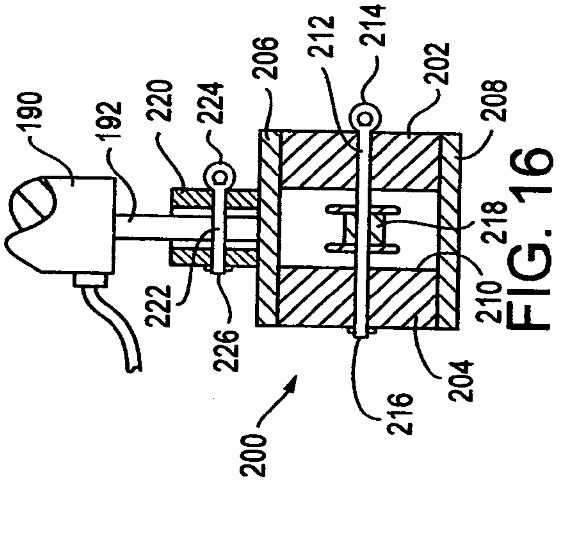
FIG. 16 is a sectional view showing features of a strand-positioning block of the second preferred embodiment of the storage system of FIG. 15 in accordance with certain principles of the invention.

Referring to FIG. 16, a roller housing 200 includes a pair of spaced thick side plates 202 and 204, which are attached at the top and bottom thereof to a top plate 206 and a bottom plate 208, respectively. An opening 210 is formed by spaced inner surfaces of the side plates 202 and 204, and the central inner surfaces of the top plate 206 and the bottom plate 208. A pin 212 is formed with a head 214 at one end and a free end 216 at the opposite end thereof. The pin 212 is inserted through aligned openings formed in the spaced side plates 202 and 204, with the head 214 located adjacent an outer surface of the side plate 202, and the free end 216 of the pin extending from an outer surface of the side plate 201. A cotter pin is inserted through a transaxial hole formed through the free end 216 of the pin 212 to retain the pin 212 in the above-described position.

During insertion of the pin 212 through the openings of the side plates 202 and 204, a chain roller 218 is positioned within the opening 210 and is mounted for rotation on an intermediate section of the pin 212.

A sleeve 220 is attached to an outer surface of the top plate 206, and is formed with aligned transaxial holes formed through opposite sides of a central portion thereof. A lower portion of the piston rod 192 is inserted in an open upper end of the sleeve 220 and a pin 222 is inserted through the holes of the sleeve and an aligned transaxial hole formed through the piston rod. The pin 222 is formed with a head 224 at one end thereof, and is assembled with a cotter pin at a free end 226 thereof to retain the piston rod 192 in assembly with the roller housing 200.

Referring again to FIG. 15, during operation of the powered cylinder 190, the piston rod 192 is moved generally vertically upward or downward to facilitate vertical movement of the roller housing 200. The roller housing 200 is located in a vertical plane between the flat bars 168 and 170, which facilitates vertical movement of the housing independently of any engagement with the flat bars.

A strand, such as, for example, a linked drive chain 228, has a first portion, or leading end, attached to the coupling block 142, and thereby to the mat 62. The drive chain 228 extends from the leading end thereof and over a chain roller 230 which is mounted for rotation between the flat bars 164 and 166. A second portion, or intermediate section, of the drive chain 228 is movable through the opening 210 of the roller housing 200 and over a portion of the chain roller 218. A trailing end of the drive chain 228 is attached to an eyelet 232, which is attached to an upper side portion of the cylinder 156.

The powered cylinder 190, in conjunction with the roller housing 200 and the chain roller 218, forms a means for moving the strand, i.e., the drive chain 228, as the piston rod 192 is moved upward and downward, with the second portion of the strand being in engagement with the means for moving the strand.

When the roller housing 200 is at its lowest position, as represented by the solid illustration of the housing in FIG. 15, the mat 62 is located within the nest 88 of the carrier 86. As the piston rod 192 is retracted within the powered cylinder 190, the roller housing 200 is moved toward an upper position. As the roller housing 200 moves upward, the weight of the mat 62 causes the mat to move downward. As illustrated in phantom in FIG. 15, the mat 62 has been moved to an intermediate position. The drive chain 228 and the roller housing 200 are also shown in phantom to illustrate the location of the chain and the housing when the mat 62 has been moved to the position shown in phantom as noted above.

The mat 62 is lowered to the terrain 22 in the same manner described above, and the crane 20, the respective beam 26 and/or the respective pad 40 are maneuvered to place the pad within the pad nest 68. When the mat 62 is to be moved into the mat nest 88, the powered cylinder 190 is operated to move the piston rod 192 and the roller housing 200 downward. As the roller housing 200 is moved downward, the drive chain 228 is extended in the manner shown in solid in FIG. 15. With continued downward movement of the roller housing 200, the mat 62 is eventually drawn into the mat nest 88 of the carrier 86. The pin 146 is then assembled with the locking bars 124 and 124*a*, and the locking block 138, in the manner described above, to secure the mat 62 with the carrier 86, and thereby the crane 20. The mat 62 is now secured in position to be transported safely with the crane 20 from one site to another.

The storage systems 84 and 186 provide facility for storing and securing the mats 62 within the nests 88 of the respective carriers 86, and thereby with the crane 20, in a safely secured manner. This allows the mats 62 to be transferred from one site to another with the crane 20, which eliminates any delays which may be encountered when the mats are transferred by some mode other than with the crane.

Further, the storage systems 84 and 186 provide facility for expeditiously maneuvering and handling of the mats 62 to thereby transfer the mats from their stored positions in the nests 88 of the respective carriers 86 to the terrain 22, and to return the mats to their stored and secured positions within the nests.

Thus, in this manner, the storage systems 84 and 186 provide facility for a comparatively safe, economical and expeditious process of enhancing the stabilization of, and supporting, the crane during operation thereof.

In general, the above-identified embodiments are not to be construed as limiting the breadth of the present invention. Modifications, and other alternative constructions, will be apparent which are within the spirit and scope of the invention as defined in the appended claims.

What is claimed is:

1. A storage system for a support mat to facilitate removably storing the support mat on a load-lifting facility, where at least one support pad, which is independent of, and in addition to, the support mat, is attached to the load-lifting facility, which comprises:

a carrier;

a nest formed on the carrier;

the nest being formed to receive the support mat in a stored position therein; and means coupled to the carrier for mounting the carrier in a supported arrangement on the load-lifting facility, to facilitate storage of the support mat with the load-lifting facility independently of the at least one support pad.

2. A storage system for a support mat to facilitate removably storing the support mat on a load-lifting facility, where at least one support pad, which is independent of, and in addition to, the support mat, is attached to the load-lifting facility, which comprises:

a carrier;

a nest formed on the carrier;

the nest being formed to receive the support mat in a stored position therein; and means, attachable to the load-lifting facility, for moving the support mat relative to and independently of the carrier and the at least one support pad.

3. The storage system as set forth in claim 2, which further comprises:

means coupled to the carrier for mounting the carrier in a supported arrangement on the load-lifting facility, to facilitate storage of the support mat with the load-lifting facility.

4. The storage system as set forth in claim 1, which further comprises:

means, attachable in part to the support mat and mounted in part on the carrier, for facilitating the locking of the mat in the stored position within the nest.

5. The storage system as set forth in claim 1, wherein the means for mounting comprises:

a support mount mountable on the load-lifting facility; and a linking couple extending between, and attached to, the carrier and the load-lifting facility.

6. The storage system as set forth in claim 1, wherein the carrier comprises:

a floor having a surface; and at least one side wall formed with, and extending from the surface of, the floor.

7. The storage system as set forth in claim 6, wherein the nest comprises:

at least a portion of the surface of the floor of the carrier; and a surface of the at least one side wall, which is contiguous with the at least a portion of the surface of the floor.

8. The storage system as set forth in claim 1, wherein the carrier comprises:

a floor having a surface;

a pair of spaced side walls formed with, and extending from the surface of, the floor;

a linking wall formed with, and extending from the surface of, the floor; and the linking wall extending between, and attached to, spaced portions of the pair of spaced side walls.

9. The storage system as set forth in claim 8, wherein the nest comprises:

at least a portion of the surface of the floor of the carrier; spaced interfacing surfaces of the pair of spaced side walls;

a surface of the linking wall, which is contiguous with the spaced interfacing surfaces of the pair of spaced side walls; and the spaced interfacing surfaces of the pair of spaced side walls and the surface of the linking wall, which is contiguous therewith, being contiguous with the at least a portion of the surface of the floor.

10. A storage system for a support mat to facilitate removably storing the mat on a load-lifting facility, where at least one support pad, which is independent of, and in addition to, the support mat, is attached to the load-lifting facility, which comprises:

a carrier;

a nest formed on the carrier;

the nest being formed to receive the support mat therein independently of the support pad;

a support mount mountable on the load-lifting facility; and a linking couple extending between, and attached to, the carrier and the support mount.

11. The storage system as set forth in claim 10, which further comprises:

a locking block mountable at a prescribed location on the support mat;

at least one locking bar mounted at a prescribed location on the carrier;

the locking block and the at least one locking bar being locatable adjacent each other when the support mat is located in the nest; and means formed on the locking block and the locking bar for facilitating securance of the mat with the carrier.

12. The storage system as set forth in claim 10, wherein the carrier comprises:

a carrier floor formed with a surface; and a carrier wall having a surface contiguous with at least portions of the surface of, and being attached to, the carrier floor.

13. The storage system as set forth in claim 12, wherein the nest comprises:

an enclosure;

the surface of the carrier wall forming a side wall of the enclosure, which at least partially surrounds the enclosure; and the at least portions of the surface of the carrier floor forming a floor of the enclosure.

14. The storage system as set forth in claim 10, which further comprises:

the nest being formed in a configuration for receipt of the support mat therein.

15. The storage system as set forth in claim 10, which further comprises:

the carrier being attached to the support mount at an angle relative to the support mount.

16. The storage system as set forth in claim 10, which further comprises:

a strand having a first portion attachable to the support mat;

means for moving the strand; and the strand having a second portion in engagement with the means for moving the strand;

where, upon operation of the means for moving the strand, the support mat is movable into and out of the nest of the carrier.

17. The storage system as set forth in claim 16, which further comprises:

means attached to the linking couple for guiding the strand during operation of the means for moving the strand.

18. The storage system as set forth in claim 16, wherein the means for moving the strand comprises:

a powered hoist coupled to a portion of the strand; and the powered hoist being mounted in a position for moving the strand relative to the carrier.

19. The storage system as set forth in claim 16, wherein the means for moving the strand comprises:

a powered cylinder;

a rod coupled to the strand and movable into and out of the powered cylinder; and the powered cylinder being mounted in a position for moving the strand relative to the carrier.

20. The storage system as set forth in claim 13, which further comprises:

a strand having a first portion attachable to the support mat;

means for moving the strand; and the strand having a second portion in engagement with the means for moving the strand;

where, upon operation of the means for moving the strand, the support mat is movable into and out of the nest of the carrier.

* * * * *